United States Patent [19]

Kelly, Jr. et al.

[11] Patent Number: 5,360,076

[45] Date of Patent: Nov. 1, 1994

[54] DUAL METAL FACE SEAL WITH SINGLE RECESSED ENERGIZER

[75] Inventors: Joseph L. Kelly, Jr.; Michael F. Welsh, both of Houston, Tex.

[73] Assignee: Hughes Tool Company, Delaware

[21] Appl. No.: 862,973

[22] Filed: Apr. 3, 1992

[51] Int. Cl.⁵ ............................................. E21B 10/22
[52] U.S. Cl. ..................................... 175/371; 277/82; 277/83; 384/94
[58] Field of Search ........................ 175/370–372, 175/227–229, 359; 277/82–84; 384/94–96

[56] References Cited

U.S. PATENT DOCUMENTS

| | | | |
|---|---|---|---|
| 3,656,764 | 4/1972 | Robinson | 175/371 |
| 3,761,145 | 9/1973 | Schumacher, Jr. | 175/371 X |
| 4,176,848 | 12/1979 | Lafuze | 277/92 |
| 4,367,904 | 1/1983 | Olschewski et al. | 384/95 |
| 4,466,621 | 8/1984 | Garner et al. | 277/84 |
| 4,516,641 | 5/1985 | Burr | 175/228 |
| 4,666,001 | 5/1987 | Burr | 175/371 |
| 4,671,368 | 6/1987 | Burr | 384/94 |
| 4,753,303 | 6/1988 | Burr | 277/83 X |
| 4,753,304 | 6/1988 | Burr | 175/367 |
| 4,838,365 | 6/1989 | Kotch | 175/371 |
| 4,903,786 | 2/1990 | Welsh | 175/371 X |
| 4,923,020 | 5/1990 | Kelly et al. | 175/372 |
| 5,040,624 | 8/1991 | Schumacher et al. | 175/371 |

*Primary Examiner*—Ramon S. Britts
*Assistant Examiner*—Frank S. Tsay
*Attorney, Agent, or Firm*—Felsman, Bradley, Gunter & Dillon

[57] ABSTRACT

An improved rigid face seal that minimizes pressure fluctuations in the lubricant in the vicinity of the seal assembly. The assembly has a first ring with a radial seal face that opposes and engages an opposed radial seal face of a second rigid ring. A first resilient energizer ring is compressed between opposed, generally conical surfaces, one on the first rigid seal ring and the other in a shaft seal groove. The mid-section of the first energizer ring is positioned relative to the journal bearing surface such that its inner periphery is inside the journal bearing surface and thereby defines an essentially constant, lubricant-filled volume between the seal assembly and the shaft seal groove—even as the cutter and seal assembly move relative to the shaft during drilling. A second energizer ring is provided to maintain sealing engagement between the radial seal faces of the first rigid ring and the second rigid ring. The energizer ring is compressed between the second rigid ring and a groove provided in the cutter. The second energizer ring thus positions the second rigid ring relative to the first rigid ring to maintain the sealing engagement of the radial seal faces of each respective rigid ring, and permits movement of the engaged rigid rings relative to the cutter and journal bearing shaft.

6 Claims, 2 Drawing Sheets

DUAL METAL FACE SEAL WITH SINGLE RECESSED ENERGIZER

CROSS REFERENCE TO RELATED PATENTS

This application has disclosure in common with two applications, now U.S. Pat. No. 4,753,304, entitled "VOLUME AND PRESSURE BALANCED RIGID FACE SEAL FOR ROCK BITS," Jun. 28, 1988 and U.S. Pat. No. 4,923,020, entitled "ROCK BIT WITH RIGID FACE SEALS AND RECESSED ENERGIZERS," May 8, 1990, each belonging to a common assignee.

BACKGROUND OF THE INVENTION

1. Field of the Invention

The field of the invention is earth boring bits-especially the seal and lubrication systems for rolling cutter rock bits.

2. Description of the Prior Art

Recently, metal face seals have been used successfully to seal lubricant within the rotatable cutters and around the cantilevered bearing shaft of a rock bit. U.S. Pat. No. 4,516,641, "Earth Boring Bit With Pressure Compensating Rigid Face Seal," May 14, 1985, to Burr, includes background information leading to this milestone in the ongoing search for rock bit seal improvement. The seal disclosed in U.S. Pat. No. 4,516,641 utilizes two rigid rings that are urged against one another by a pair of elastomeric rings confined in a seal groove between each cutter and its supporting bearing shaft. Because the axial seal movement is greater than the axial cutter movement, a grooved geometry is provided to permit relatively unrestricted seal assembly movement. As a result, pressure pulses in the lubricant around the seal and associated lubricant losses are minimized. The seal assembly thus becomes a supplemental pressure compensator that assists the primary compensator in each leg of the bit in maintaining a selected low pressure differential across the seal assembly.

An improvement to the structure disclosed in U.S. Pat. No. 4,516,641 is disclosed in U.S. Pat. No. 4,666,001, "Earth Boring Bit With Improved Rigid Face Seal Assembly," May 19, 1987, to Burr. If the rigid rings are positioned in a groove inside the periphery of an associated journal bearing surface, axial seal movement may be decreased relative to axial cutter movement. In the preferred embodiment, the axial seal movement is one half that of the cutter, which better balances the load applied to each half of the seal assembly. Hence, prolonged life of the seal assembly may be expected. An improvement to the structure disclosed in U.S. Pat. No. 4,666,001 is disclosed in U.S. Pat. No. 4,753,304, "Volume And Pressure Balanced Rigid Face Seal For Rock Bit," Jun. 28, 1988, to Burr. That structure provides a the ratio of axial seal movement to axial cutter movement of one to one, thereby eliminating the rigid ring and energizer associated with the cutter. Furthermore, groove and seal geometry are further refined to prevent lubricant loss due to a sudden pressure differential across the seal.

U.S. Pat. No. 4,923,020, "Rock Bit With Rigid Face Seals And Recessed Energizers," May 8, 1990, discloses a return to the two rigid ring, two energizer technology. The structure disclosed employs the geometry refinements disclosed in U.S. Pat. No. 4,753,304 and further provides refined seal and groove geometry adapted to the two rigid ring, two energizer technology.

SUMMARY OF THE INVENTION

It is the general object of the invention to provide a rock bit of the rotatable cutter type with an improved rigid face seal that minimizes pressure fluctuations in the lubricant in the vicinity of the seal assembly. The above and additional objects of the invention are achieved by sealing a rotatable cutter to a lubricated, cantilevered journal bearing shaft with an improved pressure compensating rigid face seal assembly. The assembly has a first rigid ring with a radial seal face that opposes and engages an opposed radial seal face of a second rigid ring. A first resilient energizer ring is compressed between opposed, generally conical surfaces, one on the first rigid seal ring and the other in a shaft seal groove. The mid-section of the first energizer ring is positioned relative to the journal bearing surface such that its inner periphery is inside the journal bearing surface and thereby defines an essentially constant, lubricant-filled volume between the seal assembly and the shaft seal groove-even as the cutter and seal assembly move relative to the shaft during drilling. Pressure variations in the vicinity of the seal assembly are minimized by sizing the system components consistently with the following formula:

$$D_s = D_c;$$

where:
- $D_s$ = mean diameter of energizer O-ring
- $D_c$ = rotatable cutter journal bearing surface diameter.

A second energizer ring is provided to maintain sealing engagement between the radial seal faces of the first rigid ring and the second rigid ring. The second energizer ring is compressed between the second rigid ring and a groove provided in the cutter. The second energizer ring thus positions the second rigid ring relative to the first rigid ring to maintain the sealing engagement of the radial seal faces of each respective rigid ring, and permits movement of the engaged rigid rings relative to the cutter and journal bearing shaft.

DESCRIPTION OF THE PREFERRED EMBODIMENT

Figure 1:
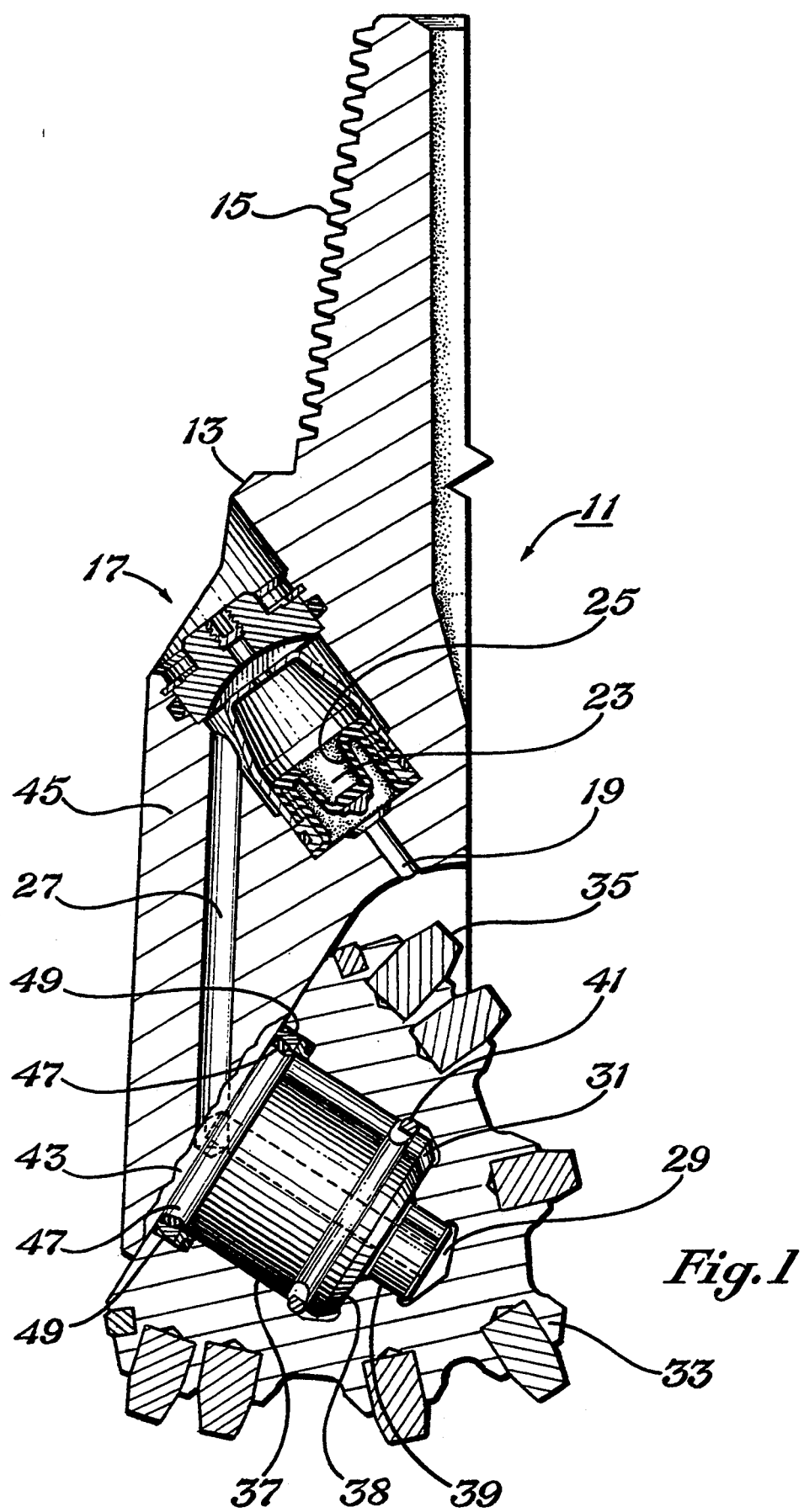
FIG. 1 is a fragmentary, longitudinal section of a rock bit of the rotatable cutter type that includes a pressure-compensated lubrication system and, between the cutter and journal bearing, a seal assembly embodying the principles of the invention.

In FIG. 1 the numeral 11 designates a rock bit having a head section 13 that is one of usually three that form a body that is threaded at 15. A lubricant pressure compensator system 17 is included in each head section 13, being vented at 19 to the exterior of the bit in the ambient drilling mud in a borehole (not shown). Lubricant fills a reservoir 23 that is separated from the drilling mud by a flexible diaphragm 25. The diaphragm 25 is part of a hydrostatic pressure compensator that tends to equalize the pressure of the lubricant with that of the drilling mud, and maintains this pressure on the lubricant in passage 27, as well as the space 29 and others between the bearing shaft 31 and rotatable cutter 33. For further information about the lubrication system, see U.S. Pat. No. 4,055,255, "Lubricant Pressure Compensator For A Rock Bit," Oct. 25, 1977. The bearing shaft 31 is cantilevered and extends inwardly and downwardly in supporting the cutter 33.

The cutter 33 has conventional teeth 35, here inserts of cemented tungsten carbide, and internal bearing surfaces that oppose those of the bearing shaft 31, including the journal bearing surface 37, thrust face 38, and pilot pin surface 39. The rotatable cutter 33 is secured to the bearing shaft 31 by a resilient snap ring 41. Further information about the snap ring retainer system may be seen in U.S. Pat. No. 4,344,658, "Cone Snap Ring," Aug. 17, 1982. There are radial and axial clearances between the various components of the bearing and its retainer system, resulting in radial and axial play or movement of the cutter on the shaft during drilling. As a consequence, the cutter 33 acts as a pump as it moves on the bearing shaft 31 during drilling, creating volume changes accompanied by pressure pulses or fluctuations in the lubricant around the shaft.

Figure 2:
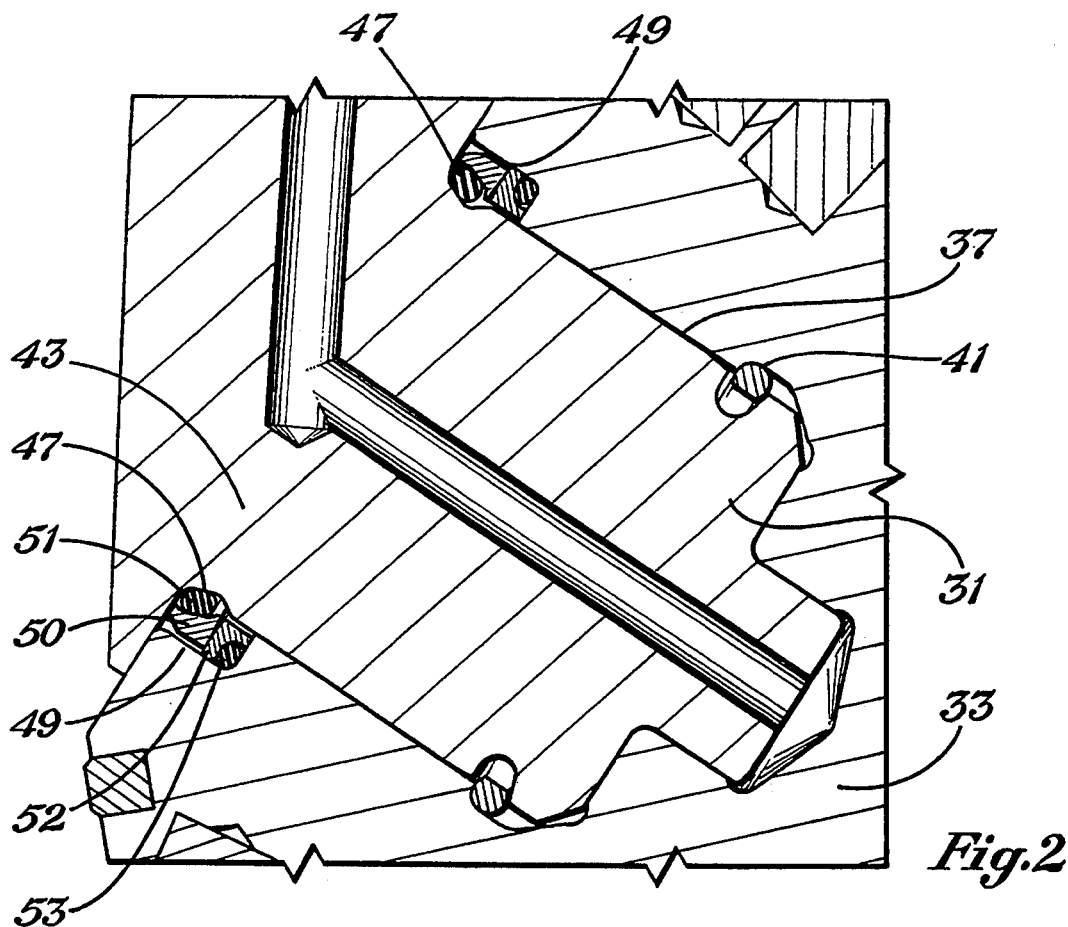
FIG. 2 is an enlarged, fragmentary, longitudinal section illustrating the seal assembly of FIG. 1 in greater detail.

The pressure pulses occur also in the seal area at the base 43 of the bearing shaft 31, where it joins the leg 45 of the head section 13. Pressure pulses occurring in the seal area of the base 43 of the bearing shaft 31 can cause extrusion of the lubricant from the bearing surfaces, past the seal, and into the borehole. Such extrusion results in rapid depletion of the lubricant contained in the reservoir 23 of the lubricant pressure compensator. Depletion of this lubricant contributes to the premature failure of the rock bit 11. Further, such pressure pulses can cause momentary increases in contact pressure between rigid seal components, thus accelerating wear of those components. This invention minimizes the amplitude of these pressure pulses. As shown in FIGS. 1 and 2, the base 43 of the bearing shaft 31 contains an annular shaft seal groove 47 which opposes an annular cutter seal groove 49 when the cutter 33 is assembled onto the bearing shaft 31. Confined within these two grooves are rigid rings 50, 52, and resilient energizer rings 51, 53, which together form the sealing system of this invention, as better seen in FIGS. 2 and 3.

The shaft seal groove 47 in the base 43 of the bearing shaft 31 is radially inward of the cylindrical bearing surface 37 toward the axis of rotation of the cutter 31 (not shown), and has an inner endwall 47a an outwardly facing and circumferential conical surface 47b at an angle alpha with the journal bearing surface, and an outer endwall 47c. The opposed cutter seal groove 49 has an inner endwall 49a, and a circumferential surface 49b extending outwardly to the mouth 61 of the cutter. The shaft rigid seal ring 50 has an inwardly facing radial sealing face 50a, and a conical circumferential region 50b that is parallel with and opposed to the conical surface 47b of the shaft seal groove 47 when the cutter 33 is assembled onto the bearing shaft 31. The shaft resilient energizer ring 51 has its inner periphery inside the journal bearing surface 37, toward the axis of rotation of the cutter 33, and upon assembly is compressed between the conical surfaces 47b, 50b of the shaft seal groove 47 and the shaft rigid seal ring 50.

The cutter rigid seal ring 52 has an outwardly facing radial sealing face 52a and an inwardly facing arcuate circumferential surface 52b that opposes the inner endwall 49a, of the cutter seal groove 49. The cutter resilient energizer ring 53 is disposed between the inwardly facing arcuate circumferential surface 52b of the cutter seal ring 52 and the inner endwall 49a, of the cutter seal groove 49, and, upon assembly, is compressed between those two surfaces.

A volume of lubricant V occupies the space bounded by seal groove 47, journal bearing surface 31, cutter rigid seal ring 52, cutter seal groove inner endwall 49a, cutter resilient energizer ring 53, shaft rigid seal ring 50, and shaft resilient energizer ring 51. The magnitude of this volume V depends upon two factors:
1) the movement of the cutter 33 with respect to the journal bearing 31; and
2) the movement of the seal assembly, comprised of shaft rigid seal ring 50, shaft energizer ring 51, cutter rigid ring 52 and cutter resilient energizer ring 53, relative to the movement of the cutter 33.

As rotatable cutter 33 moves toward the base 43 of the bearing shaft 31, the volume occupied by the lubricant decreases. Simultaneously, however, shaft energizer 51 undergoes rolling compression, moving half the distance moved by the rotatable cutter 33, normal to base 43. This action causes the volume occupied by the lubricant to increase. If this volume increase does not fully balance the volume decrease caused by cutter 33 movement, rigid seal rings 51, 52 can move together toward base 43, thereby providing an additional increase in the portion of the volume V bounded by cutter seal groove inner endwall 49a, cutter rigid seal ring 52, and cutter energizer ring 53. Similarly, with adequate clearance between cutter seal groove inner endwall 49a, and cutter rigid seal ring 52, volume changes resulting from movement of the cutter 33 away from the base 43 can be accommodated.

Because of the speed with which rotatable cutter movements occur and the small clearances between bearing shaft 31 and rotatable cutter 33, any change in volume occupied by the grease will be accompanied by a momentary pressure differential across the seal as lubricant seeks to enter or leave the volume it occupies. If such pressure becomes excessive, the seal will either leak or be damaged by excessive loads between sealing faces 50a, 52a. Ideally, therefore, the seal assembly should be designed such that the decrease in volume due to the movement of the cutter 33 relative to the bearing shaft 31 will be exactly offset by the increase in volume due to the movement of the seal assembly relative to the base 43 of the bearing shaft, and the cutter 33. Stated more simply, if the volume occupied by the lubricant remains essentially constant, no extrusion or lubricant leakage will occur across the seal assembly, and pressure-induced seal face damage will be avoided.

It has been determined that a very good engineering approximation that results in a volume maintained essentially constant is achieved by making:

$$D_s = D_c$$

where:
  $D_s$ = the mean diameter of the shaft resilient energizer ring 51; and
  $D_c$ = the diameter of the journal bearing surface of the bearing shaft 31.

For more information regarding the derivation of the above relationship see U.S. Pat. No. 4,753,304 "VOLUME AND PRESSURE BALANCED RIGID FACE SEAL FOR ROCK BITS," Mar. 9, 1987, to a common assignee.

For the harsh environment in which rock bits work, it is found that a suitable material for energizer rings 51, 53 is a highly saturated nitrile "HSN" elastomer marketed by Parco under the compound designation TC 1069-226. With this material, adequate sealing forces can be maintained between faces 50a, and 52a. It has also been determined that a suitable inclination alpha for the conical circumferential surfaces 47b and 50b is 20 degrees. For a 2.756-inch diameter journal bearing, a suitable cross-section diameter for the shaft energizer 51 is 0.169-inch. The ideal mean diameter $D_S$ of energizer 51, in a relaxed (unstretched and uncompressed) state is 2.756-inches. However, the mean diameter of energizer 51 can vary somewhat from its ideal size because of the additional volume compensation afforded by the ability of cutter rigid ring 52 to move relative to endwall 49b while maintaining sealing contact with shaft rigid ring 50 and resilient energizer ring 53. In one acceptable combination, energizer 51 has a 0.169-inch cross-section diameter and 2.796-inches mean diameter; $D_c$ is 2.756-inches and the diameter of circumferential surface 49b is 3.276-inches. With this combination, rigid rings 50 and 52 will move less than 0.003-inch away from endwall 49a, when cutter 33 moves 0.03-inch toward base 43.

Figure 3:
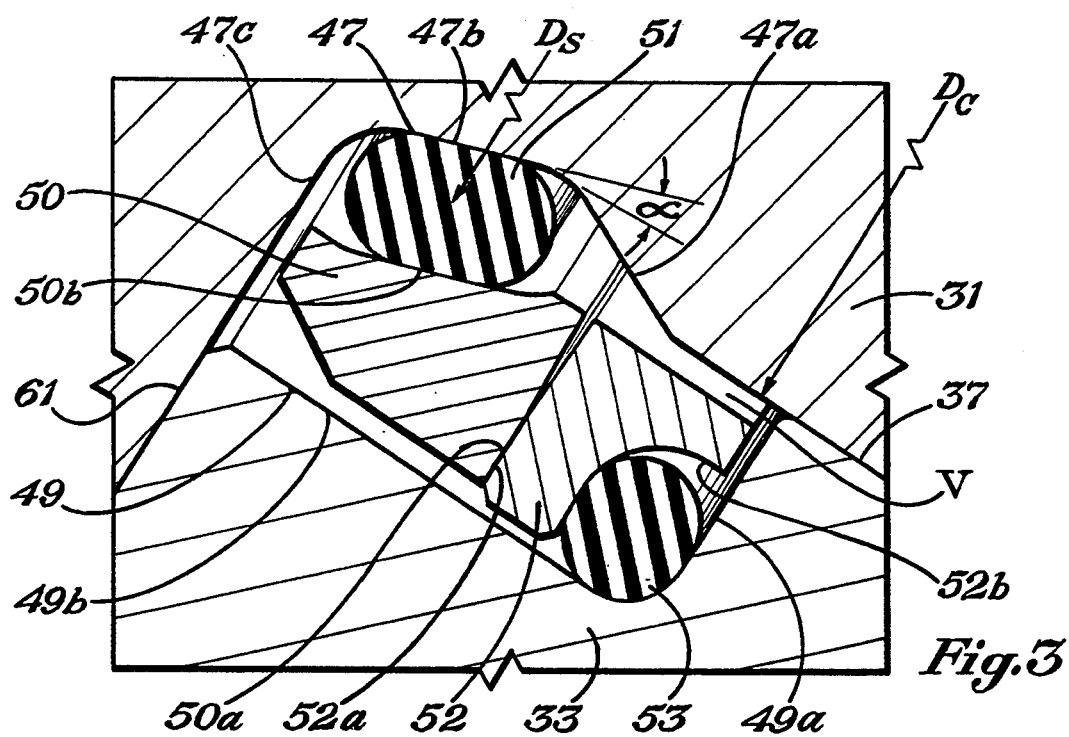
FIG. 3 is a further enlarged fragmentary, longitudinal section illustrating the seal assembly shown in FIG. 2 in yet greater detail.

The minimum diameter of shaft seal groove 47 is the same as the relaxed inner diameter of shaft seal energizer 51. The length of groove 47 and conical circumferential surface 47b are selected to accommodate the fully deformed shaft seal energizer 51, as shown in FIG. 3. As suitable material for shaft rigid ring 50 is 440C stainless steel. This material provides acceptable wear properties when hardened to approximately 50 on the Rockwell C scale. The cutter rigid ring 52 is also fabricated of 440C stainless, likewise hardened to approximately 50 Rockwell C scale. The cutter rigid seal ring 52 is dimensioned relative to the cutter seal groove 49 and the shaft rigid seal ring 50 so that the radial circumferential seal faces 50a, 52a of the shaft rigid seal ring 50 and cutter rigid seal ring 52 are in metal-to-metal sealing engagement upon assembly of the cutter 33 upon the bearing shaft 31. The cutter energizer ring 53 likewise is dimensioned relative to the inner endwall 49a, of the cutter groove 49 and the inner arcuate surface 52b of the cutter rigid ring 52 so as to urge the radial circumferential sealing face 52a of the cutter rigid ring 52 into sealing engagement with the radial sealing face 50a, of the shaft rigid ring 50. For the embodiment described above, the cutter energizer ring is an O-ring, fabricated of an identical compound, and has a cross-sectional diameter of 0.139-inch, and an inner diameter of 2.998-inches.

Radial sealing faces 50a, and 52a are lapped to a finish of about 1 or 2 $R_A$, and both are flat, except for a mildly radiused portion of the cutter seal ring 52. Such a radius provides clearance for cross-sectional rotation of shaft rigid seal ring 50 resulting from the force exerted by shaft seal energizer 51, and insures contact between the lapped surfaces of the seal faces 50a, 52a. Depending on the direction of the cross-sectional rotation of shaft rigid seal ring 50, either sealing face 50a, or 52a may be radiused to provide rotational clearance as described above. If the centroid of the cross-section of shaft energizer 50 is positioned to cause clockwise rotation, the innermost portion of face 52a would be radiused or relieved, and sealing face 50a, made flat, as described above. If the centroid of the cross-section of shaft rigid ring 50 is positioned to cause counter-clockwise rotation, the outermost portion of radial sealing face 50a, would be radiused or relieved, and face 52a would be made flat. The conical surface 50b of shaft rigid seal ring 50, and the conical surface 47b of groove 47 are provided with a surface finish of approximately 150 $R_A$ to cause frictional engagement with the shaft energizer ring 51, to discourage slippage of the shaft rigid ring 50 with respect to the energizer 51.

In operation, the seal assembly and groove configuration together define a volume of lubricant that experiences minimal change as the cutter and seal assembly move during drilling. As a consequence, pressure differentials across the seal assembly are minimized, thereby preventing pressurized extrusion of the lubricant and the associated lubricant depletion. Therefore, the present invention provides an enhanced seal that will prolong the life of the rock bit.

The present invention provides a seal assembly having a minimal axial length relative to the axis of rotation of the cutter about the cantilevered bearing shaft. By minimizing the axial length of the seal, critical journal bearing surface area is preserved, thereby prolonging the bearing life of the rock bit.

Furthermore, the mating seal rings that provide the critical metal-to-metal seal may be lapped and otherwise finished apart from the rock bit body and rotatable cutter cone. Because lapping and other machine processes are so expensive and critical to the quality of the metal-to-metal seal, the provision of separate seal rings that are easily machined achieve an economy of manufacture.

Although the invention has been described with reference to a preferred embodiment, those skilled in the art will appreciate that various changes and modifications may be made without departing from the scope of the invention.

We claim:

1. An earth-boring bit with an improved pressure compensating rigid face seal, the bit comprising:

a body;

a cantilevered bearing shaft having an axis of rotation, including a base secured to the body and a cylindrical journal bearing surface, extending obliquely inward and downward;

a lubrication system in the body, including a hydrostatic pressure compensator;

an earth-disintegrating cutter secured for rotation about the cylindrical journal bearing surface;

a cutter seal groove partially formed by an outwardly facing radial wall;

a shaft seal groove formed in the base of the bearing shaft radially inward of the cylindrical journal bearing surface toward the axis of rotation, opposite the cutter seal groove, the shaft seal groove including a generally conical circumferential surface;

a shaft rigid seal ring including a radial seal face opposite the radial wall in the cutter seal groove, and a generally conical circumferential surface opposite and spaced from the conical circumferential surface of the shaft seal groove;

a shaft resilient energizer ring compressed between the opposed conical surfaces of the shaft rigid seal ring and shaft seal groove, with its inner periphery inside the journal bearing surface, thereby locating the shaft rigid seal relative to the shaft seal groove to define a volume there between that remains essentially constant as the cutter, shaft rigid seal ring, and shaft energizer ring move during drilling;

a cutter rigid seal ring including a radial face opposing and sealingly engaging the radial seal face of the shaft rigid seal ring; and a cutter resilient energizer ring compressed between the radial wall of the cutter seal groove and the cutter rigid seal ring to maintain the sealing engagement between the radial seal faces of the cutter rigid seal ring and the shaft rigid seal ring, and to permit movement of the sealingly engaged shaft rigid seal ring and cutter rigid seal ring relative to the bearing shaft and the cutter.

2. The earth boring bit according to claim 1 wherein the cutter resilient energizer ring and the shaft resilient energizer ring are O-rings.

3. The earth boring bit according to claim 2 wherein a mean diameter through a center of a cross-section of the shaft resilient energizer ring is substantially equal to a diameter defined by the journal bearing surface of the cantilevered bearing shaft.

4. An earth-boring bit with an improved pressure compensating rigid face seal, the bit comprising:

a body;

a cantilevered bearing shaft having an axis of rotation, including a base secured to the body and a cylindrical journal bearing surface, extending obliquely inward and downward;

a lubrication system in the body , including a hydrostatic pressure compensator;

an earth-disintegrating cutter secured for rotation about the cylindrical journal bearing surface;

a cutter seal groove partially formed by an outwardly facing radial wall;

a shaft seal groove formed in the base of the bearing shaft radially inward of the cylindrical journal bearing surface toward the axis of rotation, opposite the cutter seal groove, the shaft seal groove including a generally conical circumferential surface;

a seal assembly including:

a shaft rigid seal ring including a radial seal face opposite the radial wall in the cutter seal groove, and a generally conical circumferential surface opposite and spaced from the conical circumferential surface of the shaft seal groove;

a cutter rigid seal ring including a radial face opposing and sealingly engaging the radial seal face of the shaft rigid seal ring; a shaft resilient energizer ring compressed between the opposed conical surfaces of the shaft rigid seal ring and the shaft seal groove, with its inner periphery inside the journal bearing surface, thereby locating the shaft rigid seal relative to the shaft seal groove to define a volume there between that remains essentially constant as the seal assembly and cutter move during drilling;

a cutter resilient energizer ring compressed between the radial wall of the cutter seal groove and the cutter rigid seal ring to maintain the sealing engagement between the radial seal faces of the shaft rigid seal ring and the cutter rigid seal ring, and to permit movement of the sealingly engaged shaft rigid seal ring and cutter rigid seal ring relative to the bearing shaft and cutter.

5. The earth boring bit according to claim 4 wherein the cutter resilient energizer ring and the shaft resilient energizer ring are O-rings.

6. The earth boring bit according to claim 5 wherein a nominal diameter through a center of a cross-section of the shaft resilient energizer ring is substantially equal to a diameter defined by the journal bearing surface of the cantilevered bearing shaft.

* * * * *